US 6,560,919 B2

(12) United States Patent
Burrows et al.

(10) Patent No.: US 6,560,919 B2
(45) Date of Patent: May 13, 2003

(54) WALL SCONCE INSECT TRAP

(76) Inventors: John Allen Burrows, 87 Prospect Lane, Solihull, West Midlands, 891 1HS (GB); Mathew Varghese Kaye, 28 - Horton Close, Sedgley, West Midlands DY3 3TL (GB); Paul Shapland, 24K Portnalls Road, Coulsdon Surrey CR5 3DE (GB)

( * ) Notice: Subject to any disclaimer, the term of this patent is extended or adjusted under 35 U.S.C. 154(b) by 0 days.

(21) Appl. No.: 09/860,896

(22) Filed: May 18, 2001

(65) Prior Publication Data

US 2002/0139040 A1 Oct. 3, 2002

(30) Foreign Application Priority Data

Mar. 29, 2001 (GB) .......................................... 01070936

(51) Int. Cl.[7] .............................. A01M 1/04; A01M 1/14
(52) U.S. Cl. ............................... 43/113; 43/114; 43/107
(58) Field of Search ........................... 43/107, 113, 114, 43/121, 122, 132.1, 133, 136; 362/455; D26/120

(56) References Cited

U.S. PATENT DOCUMENTS

| 3,950,886 | A | * | 4/1976 | Newhall et al. | ............... | 43/112 |
| 4,031,654 | A | * | 6/1977 | Gray | ........................... | 43/114 |
| 4,117,624 | A | * | 10/1978 | Phillips | ........................ | 43/113 |
| 4,876,822 | A | * | 10/1989 | White | ........................... | 43/113 |
| 4,959,923 | A | * | 10/1990 | Aiello et al. | ................... | 43/112 |
| 5,165,788 | A | * | 11/1992 | McLaughlin | ................. | 362/310 |
| 5,251,397 | A | * | 10/1993 | Exum et al. | ................... | 43/113 |
| 5,722,199 | A | * | 3/1998 | Demarest et al. | ............. | 43/113 |
| 5,790,040 | A | * | 8/1998 | Kreier et al. | ............. | 250/222.1 |
| 5,915,948 | A | * | 6/1999 | Kunze et al. | ................. | 43/114 |
| 5,950,355 | A | * | 9/1999 | Gilbert | ........................ | 43/113 |
| 5,974,727 | A | * | 11/1999 | Gilbert | ........................ | 43/113 |
| 6,108,965 | A | * | 8/2000 | Burrows et al. | .............. | 43/113 |
| 6,289,629 | B2 | * | 9/2001 | Greening | ...................... | 43/113 |

FOREIGN PATENT DOCUMENTS

GB 2275409 A * 8/1994 ............ A01M/1/04

* cited by examiner

Primary Examiner—Charles T. Jordan
Assistant Examiner—Tara M Golba
(74) Attorney, Agent, or Firm—David I. Roche; Baker & McKenzie

(57) ABSTRACT

An insect trap with glue boards which are mounted inside a housing so as to be not readily visible when the trap is seen from various angles. The trap uses a lens with a roughened inside surface in combination with a reflector (preferably double parabolic) to enhance a UV light source mounted inside the trap. The housing of the trap has openings through which insects are able to enter an inside chamber. The walls of the chamber are lined with glue boards, which may be treated with chemical attractant so as to increase the tendency for insects to land on the adhesive area of the glue boards. The trap is designed to appear to be a simple wall sconce, and the angle at which the boards are mounted is such that the trap may be mounted at any orientation or any elevation without any significant likelihood that trapped insects will be seen by persons looking at the trap.

16 Claims, 6 Drawing Sheets

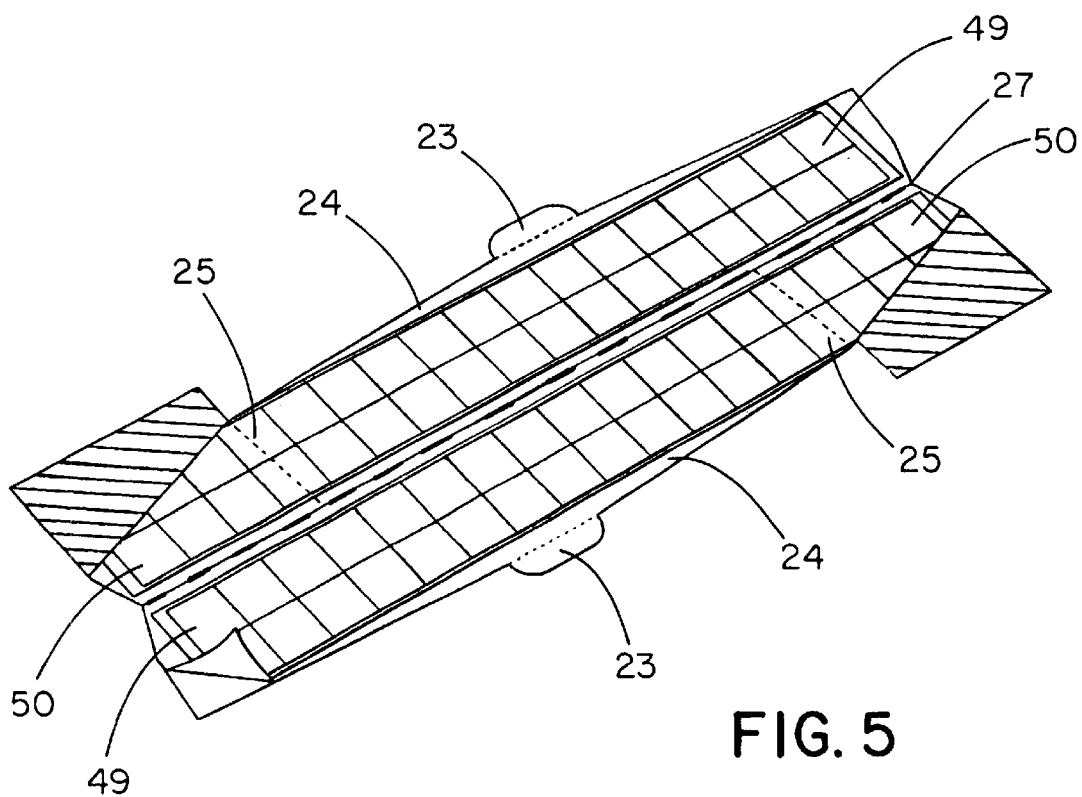
FIG. 5
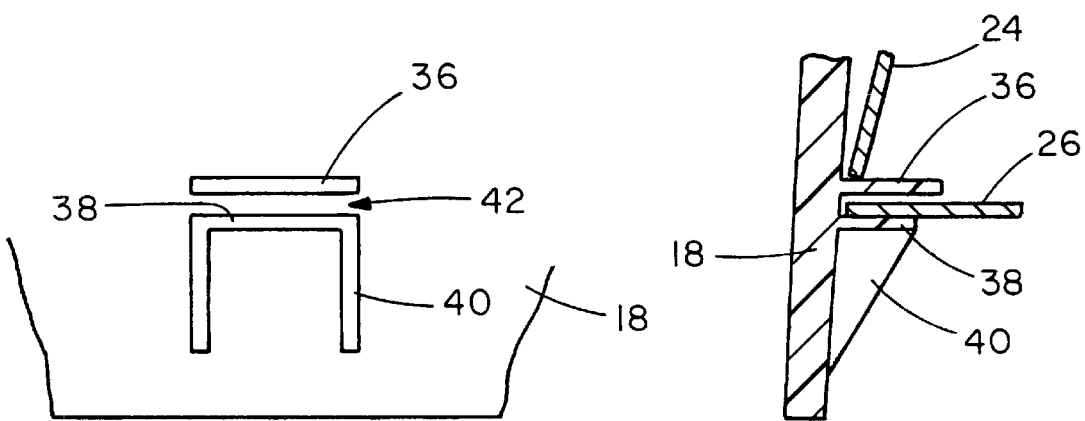
FIG. 7
FIG. 6

WALL SCONCE INSECT TRAP

BACKGROUND AND SUMMARY OF THE INVENTION

The invention relates to an insect trap which uses light to attract insects and a glue board to trap insects. The trap is adapted to be mounted to a flat surface, such as the wall or ceiling of a room.

A number of insect traps using attractant light and glue boards exist within the prior art. Examples of these include U.S. Pat. Nos. 5,365,690 and 5,505,017 (both to Nelson et al.). These traps utilize reflected light in which light is directed onto a vertical surface from an upwardly opening housing. The positioning of such traps is limited in that the glue boards inside the housing are readily visible from above. Another example of an insect trap in shown in U.S. Pat. No. 4,949,501, which shows a trap with a light and glue board mounted together on a support which is able to be adjusted to various angles. Yet another example of an insect trap is shown in U.S. Pat. No. 4,876,822. This device also shows an upwardly open housing in which the glue board is readily visible from above.

The sight of insects trapped to a glue board is repugnant to most observers, particularly in areas where food is prepared or served. Thus, it is important to design an insect trap such that the sticky surfaces of a glue board are concealed. However, in order to have the flexibility to position the trap in the most advantageous position for catching insects, keeping the sticky surface of the glue board invisible can be difficult. It has been noticed that using a UV light source in combination with a textured lens, the effect of UV light on insects as an attractant is increased. This phenomenon is disclosed in U.S. Pat. No. 6,108,965.

The insect trap of the present invention utilizes a UV lamp which may be mounted to a reflector. The lamp and/or reflector are mounted to a base. A cover attaches to the base. The cover is comprised of a housing with a main opening, adjacent to which is mounted a textured lens. The opening leads to a space between the lens and the housing to provide an entryway for the insects to enter the interior of the housing. The interior of the housing is lined with adhesive boards. The UV lamp is mounted adjacent to the textured lens to provide an attractant to lure insects to the trap. The housing is equipped with ribs and tabs so that glue boards may be mounted to the inside surface of the housing in such a way as to be invisible once the housing is attached to the base.

The objects and advantages of the present invention will be better understood by reviewing the following specification in conjunction with the accompanying drawings wherein:

BRIEF DESCRIPTION OF THE DRAWINGS

FIG. 5 is a perspective view of a pair of glue boards made in accordance with the present invention;

FIG. 6 is an enlarged cross-sectional view showing a retaining tab for connecting the housing to the base and for retaining the glue boards within the housing of the present invention;

FIG. 7 is a front elevational view of the retaining tab shown in FIG. 6;

DETAILED DESCRIPTION OF AN EMBODIMENT OF THE PRESENT INVENTION

Figure 1:
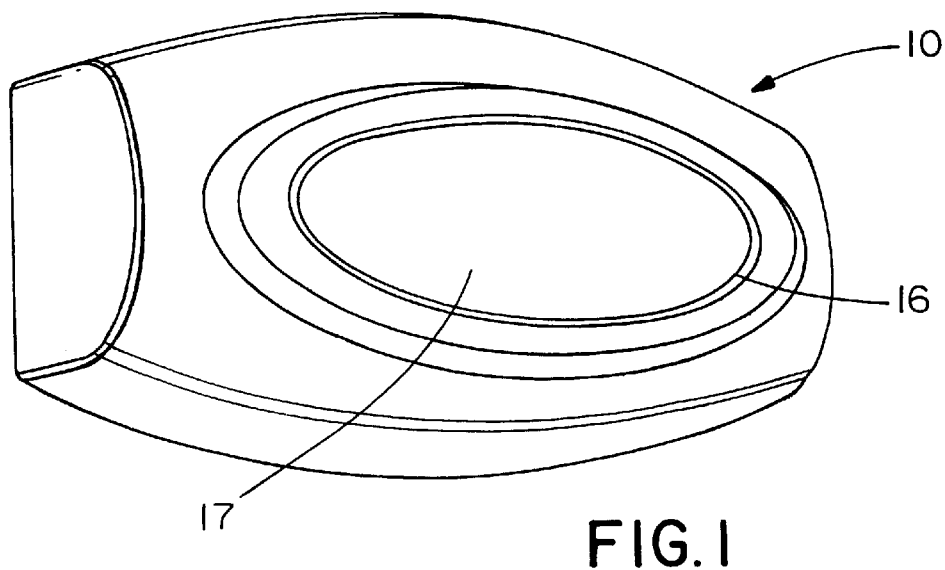
FIG. 1 is a perspective view of a trap made in accordance with the present invention.

FIG. 1 is a perpsective view showing a trap 10 with the textured lens 16 mounted over the main entrance 17 of the trap. FIG. 1 shows the trap 10 mounted in a horizontal position. As can be seen from FIG. 2, the trap of the present invention can also be readily mounted with its longitudinal axis in a vertical orientation.

Figure 2:
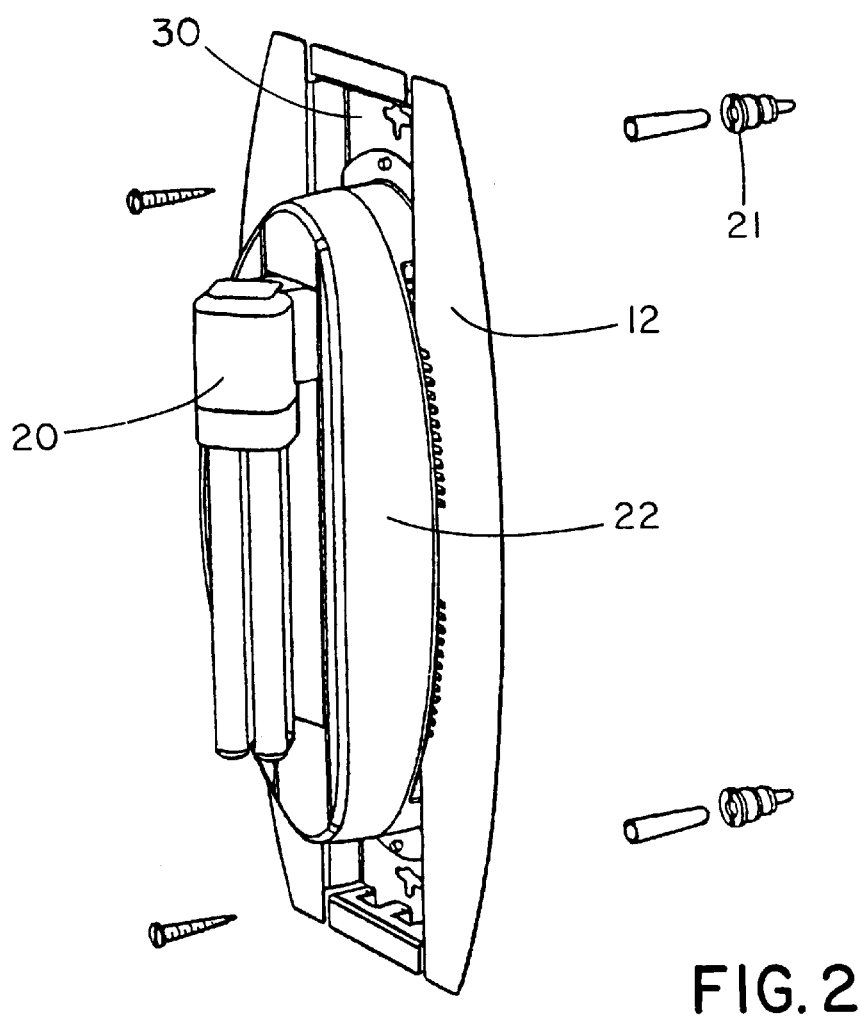
FIG. 2 is a perspective view of the base, reflector and lamp of a trap made in accordance with the present invention without a cover attached.

FIG. 2 shows the base 12 with a reflector 22 mounted in a central channel 30 formed in the base 12. A UV lamp 20 is mounted on the upper portion of the reflector 22. Wall anchors 21 and associated fasteners may be used to mount the trap of the present invention to a flat surface.

Figure 3:
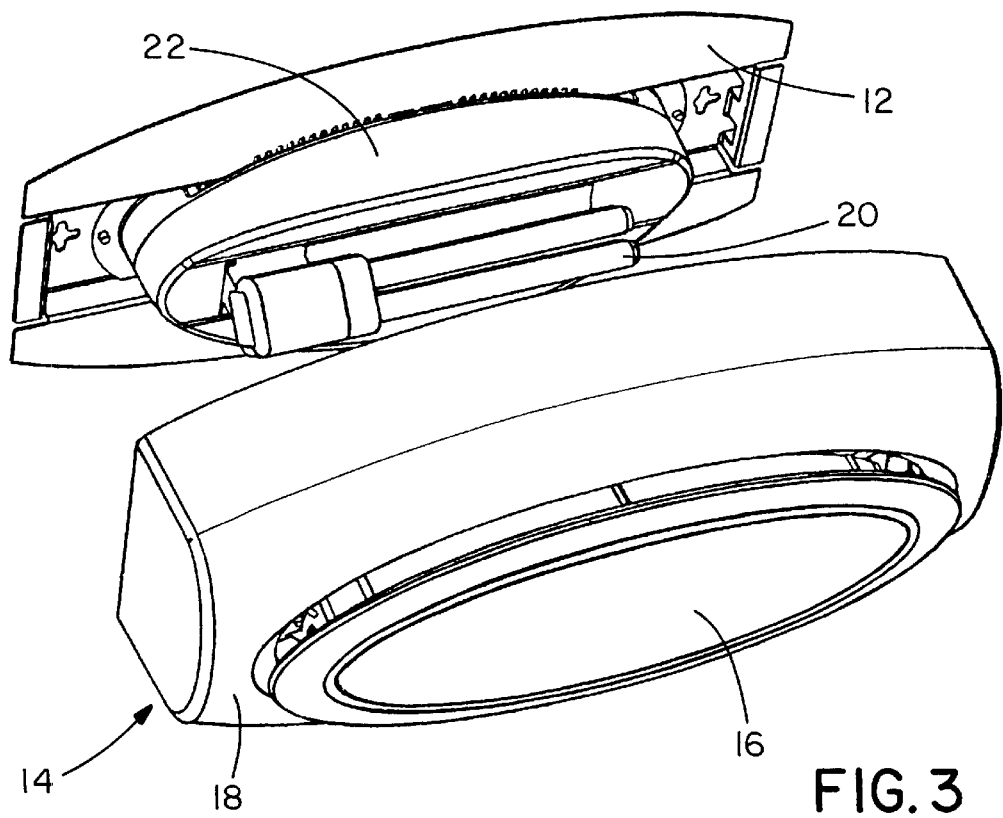
FIG. 3 is a partially exploded perspective view of a base and cover of an insect trap of the present invention.

FIG. 3 shows the cover 14, which is comprised of a housing 18 and a textured lens 16. The cover 14 fits over and is attached to the base 12.

Figure 4:
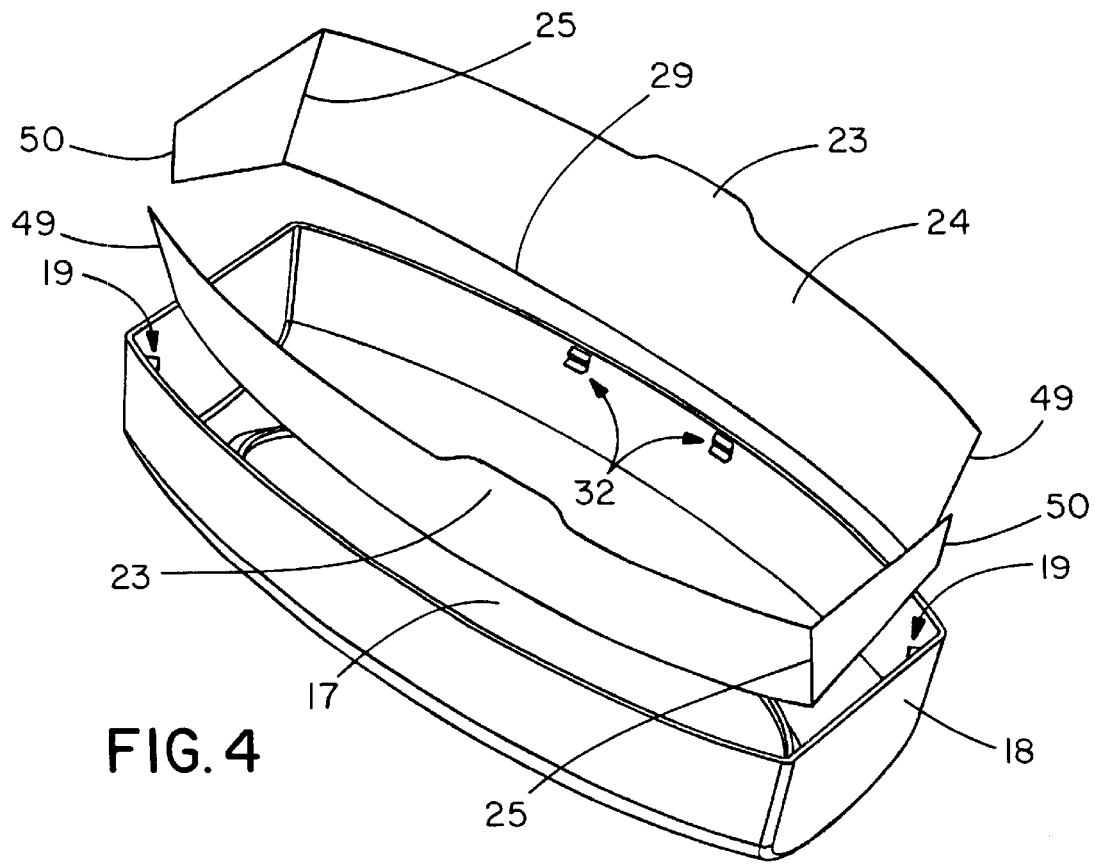
FIG. 4 is an exploded view of a cover and a pair of glue boards made in accordance with the present invention.

FIG. 4 shows the manner by which the glue boards 24 fit into and line the inside surfaces of the housing 18. Please also note, that in another embodiment, the glue boards can contain a chemical insect attractant such as one made of a material comprising one or more pheromones. Retaining ribs 19 project inwardly from two diagonally opposite corners of the housing 18. The glue boards 24 are cut and creased, as shown in FIG. 5, so that they can be bent and fitted into the inside of the housing 18 with the ends of each board abutting each side of rib 19. Retaining tabs 32 cooperate with the retaining ribs 19 to engage the lower edges of the glue boards 24. The upper edges of the boards 24 fit into recesses 48 formed at the sides of the central opening 17.

As can be seen in FIG. 5, the glue boards 24 can be made from a single sheet with a central perforation 27, so that the two boards 24 can be shipped as a single sheet. Each board has a pull tab 23 and an angled crease 25, which allows the board to closely conform to the inside surface of the housing 18. Each of the boards 24 has a narrow end 49 and a wide end 50. The narrow end 49 bend about the crease 25, which allows the board to assume a position adjustment to the short ends walls of the housing 18.

FIG. 6 is an enlarged cross-sectional view of the lower edge of the housing wherein a pair of retaining tabs 32 are formed on each side of the housing 18. Each retaining tab 32 is comprised of an upper board lip 36 and a lower wing lip 38, forming a slot 42 therebetween. The wing lip 38 is supported by buttresses 40. This can be seen in FIGS. 6 and 7. The following can be seen in FIGS. 6–8. Channel 30 causes the wings 26 and 28 of the base 12 to be spaced away from the surface to which the trap is mounted. The flexibility of the housing allows it to deflect an amount sufficient to allow the lips 36 and 38 to fit around the wings 26 and 28, and for the slots 42 to receive the wings of the base. The board lip 36 supports a lower edge of the glue board 24. The glue boards 24, therefore, are each supported at several locations to firmly retain the glue board on the inside of the housing 18. In particular, each end of a glue board 24 is wedged between the retaining ribs. 19 and on the top by the recess 48 formed by the overhang 46 which is on the periphery of the main entrance 17 of the housing 18, and along the lower edge of each glue board 24 by a pair of board lips 36, one at each retaining tab 32.

FIG. 7 is a front elevational view of a retaining tab 32 showing the upper and lower lips, 36 and 38 respectively, and the slot 42 into which a wing of the base 12 fits.

Figure 8:
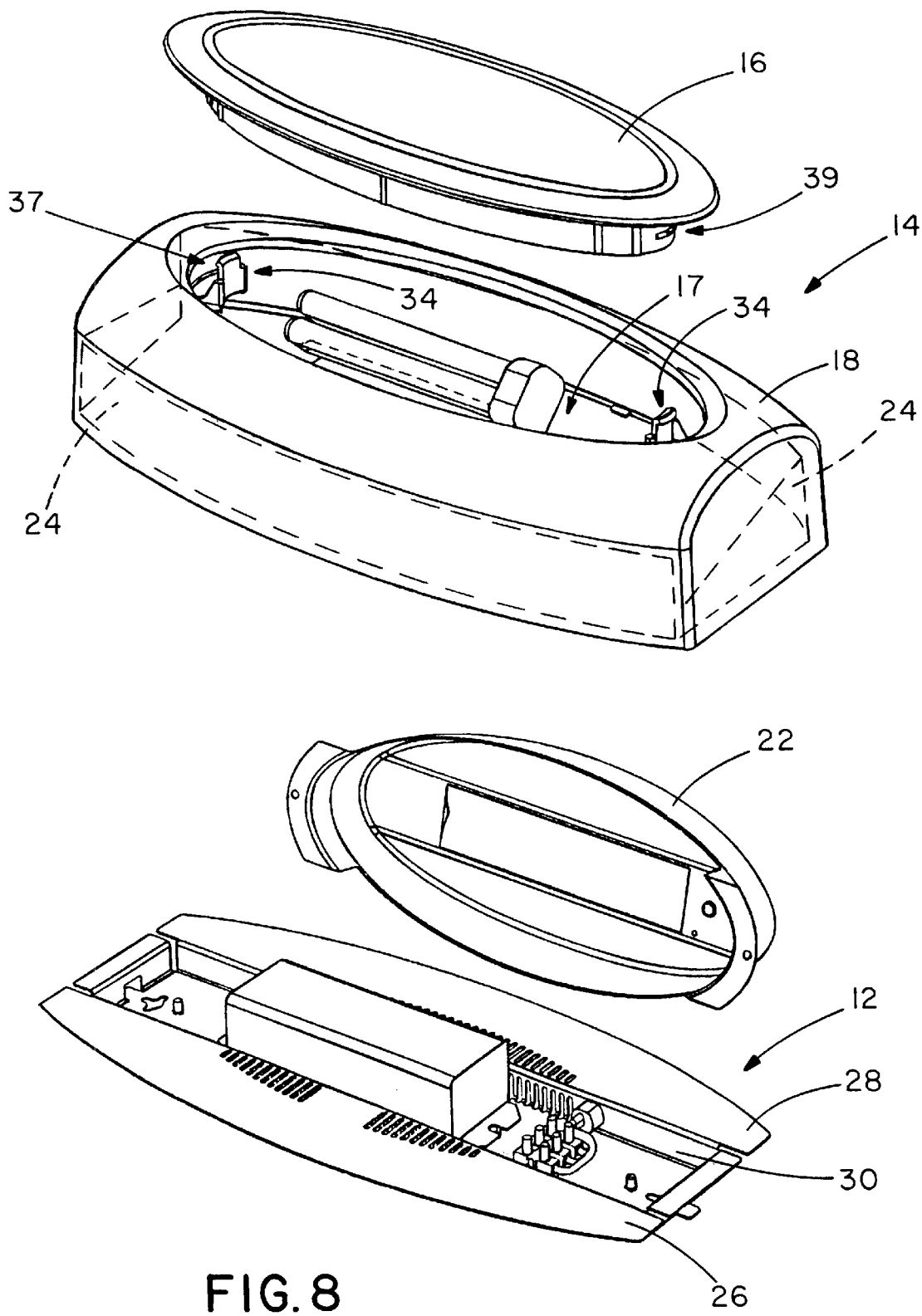
FIG. 8 is an exploded view of a base, reflector, housing and lens made in accordance with the present invention.
Figure 9:
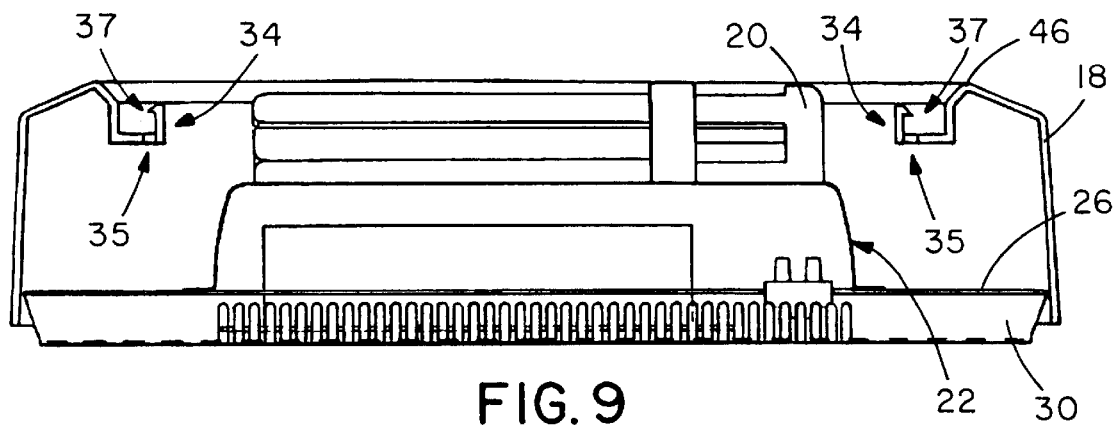
FIG. 9 is a longitudinal cross-section through a trap of the present invention without the lens attached.

FIG. 8 is an exploded view showing the base 12, reflector 22, housing 18 and lens 16. The lens 16 attaches to the housing 18 to form the cover 14. A pair of lens clips 34 are at opposite ends of the main entrance 17. As can be seen in FIG. 9, the lens clips 34 extend down and radially inwardly from the overhang 46. An opening 35 in the base of the lens clip allows a ledge 37 to be formed on the clip 34. The ledge 37 snaps into a slot 39 formed in the lower ends of the lens 16. The overhang 46, from which the lens clip 34 extends, slants downwardly and inwardly from the uppermost portion of the housing 18.

Figure 10:
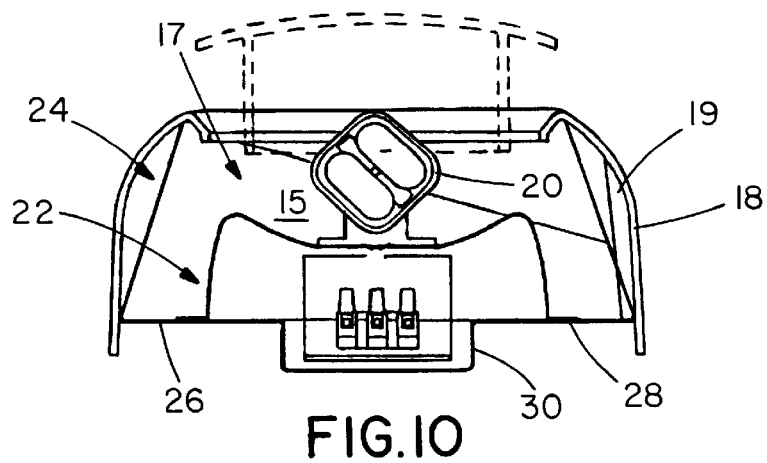
FIG. 10 is a transverse cross-section of a trap made in accordance with the present invention without the lens attached.

FIG. 10 also shows the manner by which a glue board 24 is retained on the inside surface of the housing 18. As can be seen from FIGS. 4 and 5, each glue board 24 has a wide end 50 and a narrow end 49. The glue board 24 is folded along the crease 25 and the narrow end 50 of the glue board 24 fits into a crevice formed by the retaining rib 19. An upper long edge 29 of the glue board fits into a recess 48 formed by the overhang 46 and a lower edge of the glue board 24 abuts two retaining tabs 32. The pull tab 23 extends slightly downwardly between the retaining tabs 32 to facilitate removal of the glue boards when replacement becomes necessary.

Light from the UV lamp 20 shines toward the lens 16, directly outwardly from the lamp 20 to the lens 16, and indirectly from the lamp 20 to the reflector 22, and then outwardly to the lens 16. The inside surface of the lens 16 is roughened so as to increase the reach and attractiveness of the UV light. Insects are drawn to the trap and enter the chamber 15 within the housing 18, which is substantially lined with the glue boards 24, where the insects are trapped when they land on, or otherwise touch, the sticky surface of the glue boards 24. The chamber 15 in the trap shown in FIGS. 1 through 10 is primarily formed by the roughened inside surface of the lens 16, adhesive surface of the glue boards 24, the reflector 22, and the main entrance 17. Small areas of the base 12 and housing 18 also form a part of the surface area of the chamber 15. The UV lamp is disposed in the chamber 15.

Figure 11:
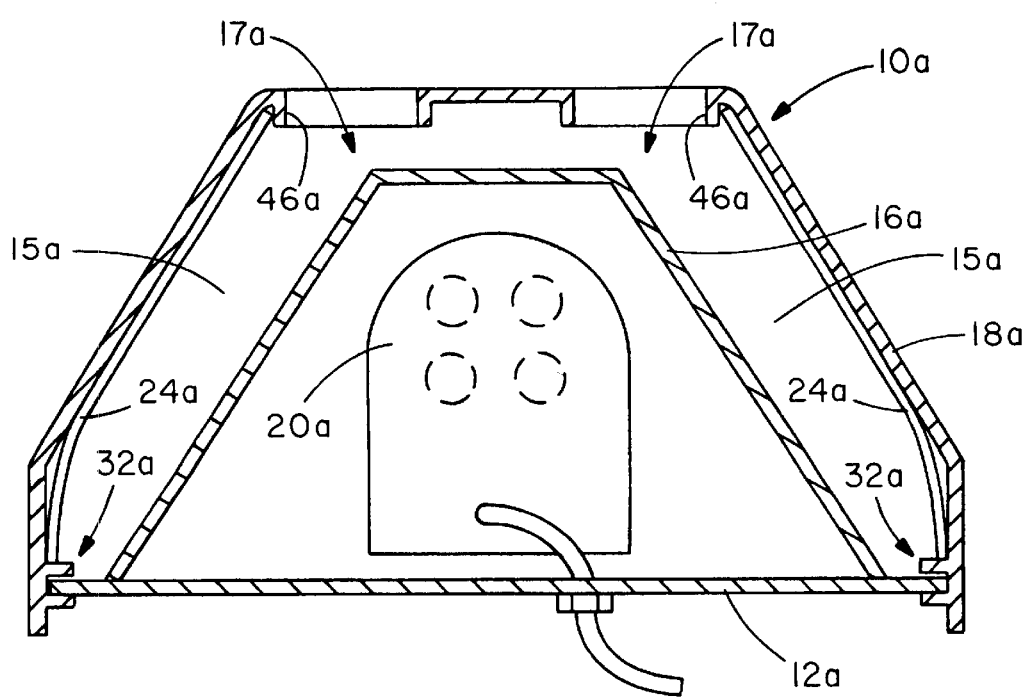
FIG. 11 is a transverse cross-section of another embodiment of a trap made in accordance with the present invention.

FIG. 11 is another embodiment of the present invention. Similar reference numerals are used to those numeral used in describing the earlier described embodiment of the invention, but the suffix "a" is added to differentiate the components of the FIG. 11 embodiment from similar components of the embodiment of FIGS. 1–10. Unlike the embodiment of FIGS. 1–10 the FIG. 11 embodiment has a lens 16a which is mounted to the base 12a, rather than to the housing 18a. In the FIG. 11 embodiment, a chamber 15a is formed by the lens 16a and a pair of glue boards 24a. When the boards need to be replaced, the housing 18a may be disengaged from the base 12a, and the boards may be lifted out of their wedged engagement between the retaining tabs 32a and overhangs 46a near the entrances 17a on the housing 18a.

As can be seen in both the embodiment of FIGS. 1–10 and in the embodiment of FIG. 11, the glue boards have a main trapping surface which is at an acute angle with respect to the base of the trap and with respect to the surface to which the trap is mounted. The acute angle of the boards helps prevent the trapped insects from being seen by anyone looking at the trap, regardless of the elevation at which the trap is mounted. In the the embodiment of FIGS. 1–10 the angle of the board relative to the base, as shown in FIG. 10, is about 70 degrees, and the angle of the board in FIG. 11 is about 60 degrees.

Figure 12:
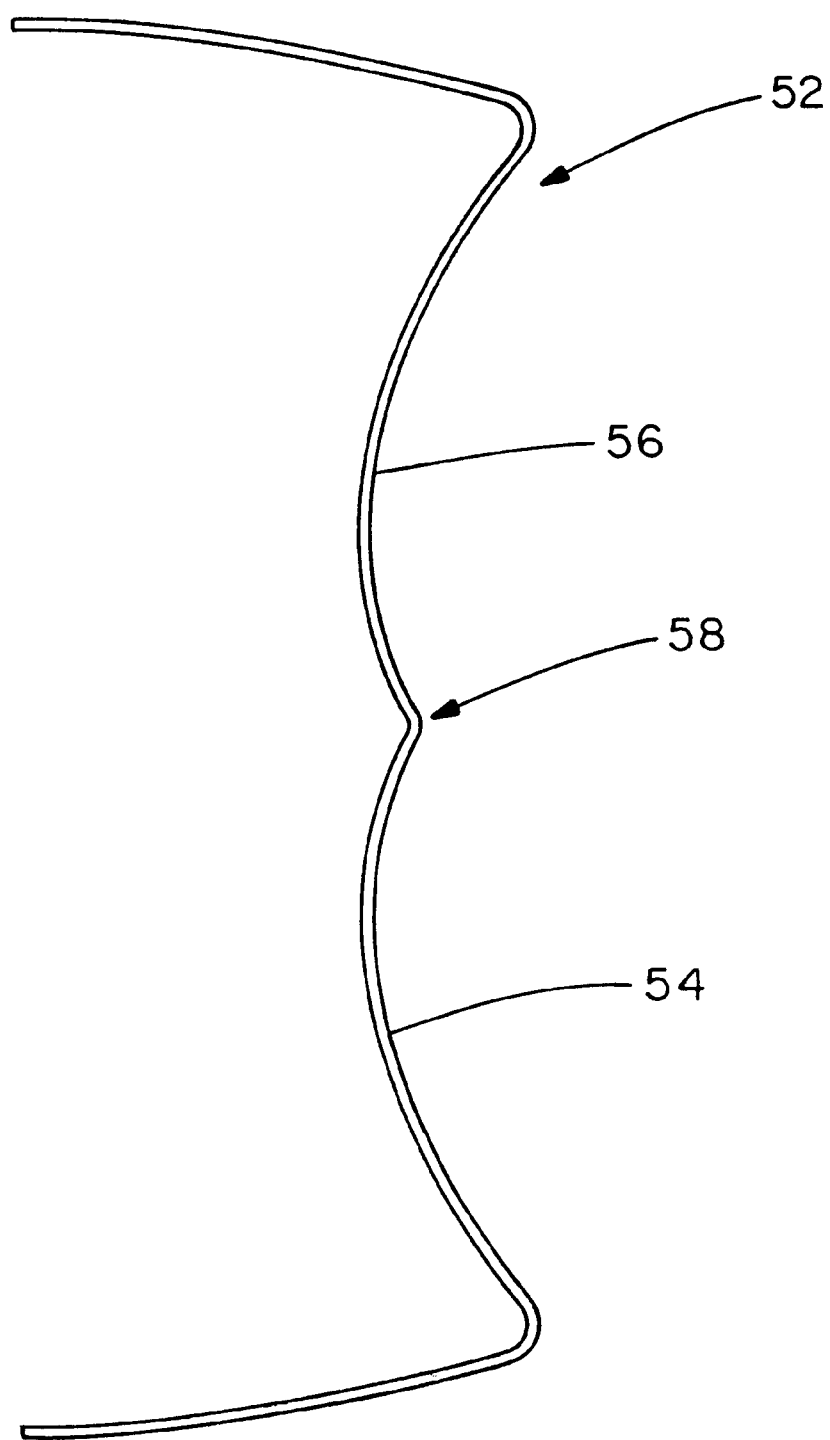
FIG. 12 is a transverse cross-section of a preferred form of reflector for use in the present invention.

FIG. 12 is a cross-sectional view showing the shape of a reflector 52 which is particularly advantageous as used in combination with the insect trap of the present invention. The reflector has two adjacent reflecting surfaces 54 and 56, each of which is preferably parabolic, although surfaces with curvatures other than parabolic may be used. Light from a UV source (not shown in FIG. 12, but like the lamp 20, 20a or a similar lamp) is reflected by the surfaces 54 and 56 in the direction of the opening covered by the lens of the trap. The two concave surfaces 54 and 56 help the light from the UV source to bypass the source itself and direct the UV rays toward the entrance to the trap. Using two surfaces creates less scattering of the rays. The two parabolic surfaces meet at a central ridge 58, which runs along a major portion of the length of the reflector. Light reflecting from the glue boards on the inside of the housing will also be reflected by two concave parabolic surfaces 54 and 56 toward the lens and the opening of the trap. The reflector 52 is preferably a deep drawn aluminum stamping with a low-absorption reflective outer surface, such as brushed or satin (as opposed to polished).

While specific apparatuses and features have been disclosed in the preceding description, and while several component parts have been described in the specification and have been described in detail, it should be understood that these specific descriptions of components and features have been provided for the purpose of disclosing examples which demonstrate the principles of the present invention. There are many variations, improvement, modifications and alternatives thereof which will become apparent to those who are versed in the art of insect trap design. Therefore, the scope of the present invention is to be determined by the appended claims and not by reference to the specific examples.

What is claimed is:

1. An insect trap adapted to be mounted to a flat surface comprising:
   a) a supporting base,
   b) a light source carried by said supporting base, said light source having an ability to transmit ultra violet light,
   c) a cover with a first part having at least one board support, said board support being arranged to hold an adhesive board in a position whereby an adhesive surface of said board faces said light source,
   d) said trap having a lens, said lens overlying said light source,
   e) said first part and said lens being separated by a gap, said gap forming an entrance to a chamber, said chamber being at least partially defined by said adhesive surface of said board.

2. An insect trap in accordance with claim 1 wherein said light source is an ultra violet light source, and ultra violet light is enhanced by a lens having a roughened inside surface facing said light source, whereby enhanced ultra violet light emanates from said trap to attract insects to said trap.

3. An insect trap in accordance with claim 1 wherein said first part of said cover has a pair of opposing adhesive board supports, each of said opposing adhesive board supports being arranged to hold an adhesive board in a position whereby each board faces said light source and at least partially defines said chamber, each board having a main adhesive surface making an acute angle with said base and a surface to which said trap is mounted.

4. An insect trap in accordance with claim 3 wherein said opposing adhesive board supports are arranged relative to said cover such that said cover blocks direct lines of sight to adhesive surfaces of said boards from outside of said trap.

5. An insect trap in accordance with claim 4 wherein said opposing adhesive board supports are arranged such that an adhesive surface of a board held by one of said opposing adhesive board supports faces a surface to which said trap is mounted.

6. An insect trap in accordance with claim 5 wherein said light source is disposed between said pair of opposing adhesive board supports.

7. An insect trap in accordance with claim 1 wherein said lens snaps into engagement with said first cover part.

8. An insect trap in accordance with claim 1 wherein said lens is mounted to said base.

9. An insect trap in accordance with claim 1 wherein said first cover part comprises a central opening and said board support comprises a lip extending inwardly from at least an upper portion of an inside surface of said first cover part.

10. An insect trap in accordance with claim 1 wherein said lens is comprised of a translucent plastic member with an inside surface facing said light source, and an outside surface facing outwardly of said trap, said inside surface having a roughened surface which enhances rays of ultra violet light as said rays emanate from said light source through at least one opening in said first cover part.

11. An insect trap in accordance with claim 1 including a reflector adjacent to said light source, said reflector having at least one curved and concave surface.

12. An insect trap in accordance with claim 11 including said reflector being comprised of two adjacent parabolic surfaces, each directing light from said light source in a direction toward said entrance.

13. An insect trap adapted to be mounted to a flat surface, such as a wall, comprising:
  a) a supporting base,
  b) a light source carried by said supporting base, said light source having an ability to transmit ultra violet light,
  c) a cover removably attachable to said base, said cover having a first part with at least one opening forming an entrance to a chamber inside said cover, at least one board support formed on an inside surface of said cover, said board support being arranged to hold an adhesive board in a position within whereby an adhesive surface of said board faces said light source,
  d) said cover having a lens, said lens overlying said light source,
  e) said cover and said lens being separated by a gap, said gap providing pathway for insects to gain access to said chamber,
  f) said chamber being at least partially defined by said board support and said cover, said light source being disposed in said chamber.

14. An insect trap in accordance with claim 13 wherein said cover has a pair of opposing adhesive board supports extending along opposite inside walls of said cover, a board with an adhesive insect-grabbing surface being carried by each of said opposing adhesive board supports.

15. An insect trap in accordance with claim 14 wherein a chemical insect attractant is applied to said board.

16. An insect trap in accordance with claim 15 wherein said chemical insect attractant is a material comprising one or more pheromones.

* * * * *